United States Patent
Ghatage et al.

(10) Patent No.: US 12,470,627 B2
(45) Date of Patent: *Nov. 11, 2025

(54) COOKIE-BASED NETWORK LOCATION OF STORAGE NODES IN CLOUD

(71) Applicant: Salesforce, Inc., San Francisco, CA (US)

(72) Inventors: Anup Ghatage, Fremont, CA (US); Ankit Jain, Mountain View, CA (US); Venkateswararao Jujjuri, Portland, OR (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,276

(22) Filed: Jul. 2, 2024

(65) Prior Publication Data

US 2024/0357009 A1   Oct. 24, 2024

Related U.S. Application Data

(63) Continuation of application No. 18/056,013, filed on Nov. 16, 2022, now Pat. No. 12,047,448, which is a continuation of application No. 17/163,514, filed on Jan. 31, 2021, now Pat. No. 11,509,721.

(51) Int. Cl.
| | |
|---|---|
| *H04L 67/1097* | (2022.01) |
| *G06F 9/4401* | (2018.01) |
| *G06F 16/953* | (2019.01) |

(52) U.S. Cl.
CPC ........ *H04L 67/1097* (2013.01); *G06F 9/4416* (2013.01); *G06F 16/953* (2019.01)

(58) Field of Classification Search
None
See application file for complete search history.

(56) References Cited

U.S. PATENT DOCUMENTS

| | | | |
|---|---|---|---|
| 7,085,909 B2 | 8/2006 | Ananthanarayanan et al. | |
| 7,237,027 B1* | 6/2007 | Raccah | G06F 16/182 |
| | | | 709/224 |
| 7,480,654 B2 | 1/2009 | Jujjuri et al. | |
| 7,529,859 B2 | 5/2009 | Young et al. | |
| 7,574,439 B2 | 8/2009 | Everhart et al. | |

(Continued)

*Primary Examiner* — Scott B Christensen
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to storing location information about storage nodes in cookies. A cloud-based service may send location requests to an orchestration service that instantiated storage nodes included in a storage cluster of the cloud-based service. The cloud-based service may receive location information that identifies in which computer zone that a given storage node is located. The cloud-based service may store the location information in cookies at a metadata store that is shared among the storage nodes. The cloud-based service may receive, from a client node, a search request to identify ones of the storage nodes that store particular data. The cloud-based service may return a set of cookies corresponding to identified storage nodes. The set of cookies may enable the client node to determine whether there is a storage node that stores the particular data and is within the same computer zone as the client node.

20 Claims, 8 Drawing Sheets

(56) References Cited

U.S. PATENT DOCUMENTS

| | | |
|---|---|---|
| 7,660,836 B2 | 2/2010 | Bolik et al. |
| 7,668,924 B1 * | 2/2010 | Young ................ H04L 67/1097 709/212 |
| 7,873,619 B1 * | 1/2011 | Faibish .................. G06F 16/13 707/823 |
| 8,041,676 B2 | 10/2011 | Naineni et al. |
| 8,327,004 B2 * | 12/2012 | Baldwin ............... G06F 3/0605 709/227 |
| 8,392,370 B1 * | 3/2013 | Whitney ................ G06F 3/067 707/640 |
| 8,700,584 B2 | 4/2014 | Ananthanarayanan et al. |
| 8,886,672 B2 | 11/2014 | Chaurasia et al. |
| 8,918,862 B2 | 12/2014 | Bhattiprolu et al. |
| 8,982,145 B2 | 3/2015 | Hernandez et al. |
| 9,111,261 B2 | 8/2015 | Bhattiprolu et al. |
| 9,311,384 B1 | 4/2016 | Jain et al. |
| 9,405,803 B2 | 8/2016 | Jain |
| 9,471,802 B2 | 10/2016 | Beecham et al. |
| 9,536,244 B1 * | 1/2017 | Amiel ...................... G06F 8/24 |
| 9,542,403 B2 | 1/2017 | Jujuri et al. |
| 9,547,698 B2 | 1/2017 | Jain et al. |
| 9,588,752 B2 | 3/2017 | Bhattiprolu et al. |
| 9,699,017 B1 * | 7/2017 | Gupta .................. H04L 69/329 |
| 9,779,140 B2 | 10/2017 | Jain et al. |
| 9,892,274 B2 | 2/2018 | French et al. |
| 10,148,498 B1 * | 12/2018 | Gould ................ H04L 67/1095 |
| 10,158,642 B2 | 12/2018 | Jujjuri et al. |
| 10,713,223 B2 | 7/2020 | Jujjuri et al. |
| 10,862,957 B2 | 12/2020 | Jujjuri et al. |
| 2004/0230877 A1 | 11/2004 | Clark et al. |
| 2007/0011214 A1 * | 1/2007 | Jujjuri .................... G11B 27/10 |
| 2007/0174248 A1 * | 7/2007 | Kumugai ........... G06F 16/24532 |
| 2008/0244031 A1 | 10/2008 | Rai et al. |
| 2010/0023722 A1 * | 1/2010 | Tabbara ............... H04L 43/0811 711/170 |
| 2010/0251010 A1 * | 9/2010 | Peters ................... G06F 3/0608 707/610 |
| 2010/0333116 A1 * | 12/2010 | Prahlad .................. G06Q 30/02 713/153 |
| 2012/0016890 A1 | 1/2012 | Bhattiprolu et al. |
| 2012/0072456 A1 | 3/2012 | Dube et al. |
| 2012/0323481 A1 | 12/2012 | Bhattiprolu et al. |
| 2013/0151888 A1 | 6/2013 | Bhattiprolu et al. |
| 2013/0276070 A1 * | 10/2013 | Lee .......................... G06F 21/45 726/4 |
| 2014/0089557 A1 | 3/2014 | Bhattiprolu et al. |
| 2014/0280079 A1 | 9/2014 | Jain et al. |
| 2014/0316930 A1 | 10/2014 | Jain et al. |
| 2014/0317099 A1 | 10/2014 | Jain et al. |
| 2014/0317105 A1 | 10/2014 | Jain et al. |
| 2015/0178359 A1 * | 6/2015 | Grasselt ................. H04L 47/72 707/602 |
| 2015/0254325 A1 * | 9/2015 | Stringham .......... G06F 16/9535 707/737 |
| 2016/0241995 A1 * | 8/2016 | Eda ....................... H04W 4/021 |
| 2016/0373537 A1 * | 12/2016 | Lin ........................... G06F 8/00 |
| 2018/0107409 A1 * | 4/2018 | Condict ................ G06F 3/0631 |
| 2018/0329605 A1 | 11/2018 | Venkateswararao |
| 2019/0045007 A1 * | 2/2019 | Wyatt .................... G06F 11/008 |
| 2021/0263367 A1 | 8/2021 | Jang et al. |
| 2021/0263667 A1 * | 8/2021 | Whitlock ............ G06F 11/3447 |

* cited by examiner

COOKIE-BASED NETWORK LOCATION OF STORAGE NODES IN CLOUD

PRIORITY CLAIM

The present application is a continuation of U.S. application Ser. No. 18/056,013, entitled "COOKIE-BASED NETWORK LOCATION OF STORAGE NODES IN CLOUD," filed Nov. 16, 2022, which is a continuation of U.S. application Ser. No. 17/163,514, entitled "COOKIE-BASED NETWORK LOCATION OF STORAGE NODES IN CLOUD," filed Jan. 31, 2021 (now U.S. Pat. No. 11,509,721), the disclosures of which are incorporated by reference herein in their entireties.

BACKGROUND

Technical Field

This disclosure relates generally to a storage system and, more specifically, to storing cookies that include location information for storage nodes running in the cloud.

Description of the Related Art

Modern database systems routinely implement management systems that enable users to store a collection of information in an organized manner that can be efficiently accessed and manipulated. In many cases, these database systems include database nodes and storage nodes that work together to implement database services. The database nodes often process database transactions to read and manipulate data while the storage nodes work to ensure that the results of those transactions are stored in a manner that can be efficiently accessed. The storage nodes also often seek to ensure that the data of a database system is sufficiently replicated across the storage nodes so as to prevent data loss in the event that portions of the database system fail or become unavailable.

DETAILED DESCRIPTION

Figure 1:
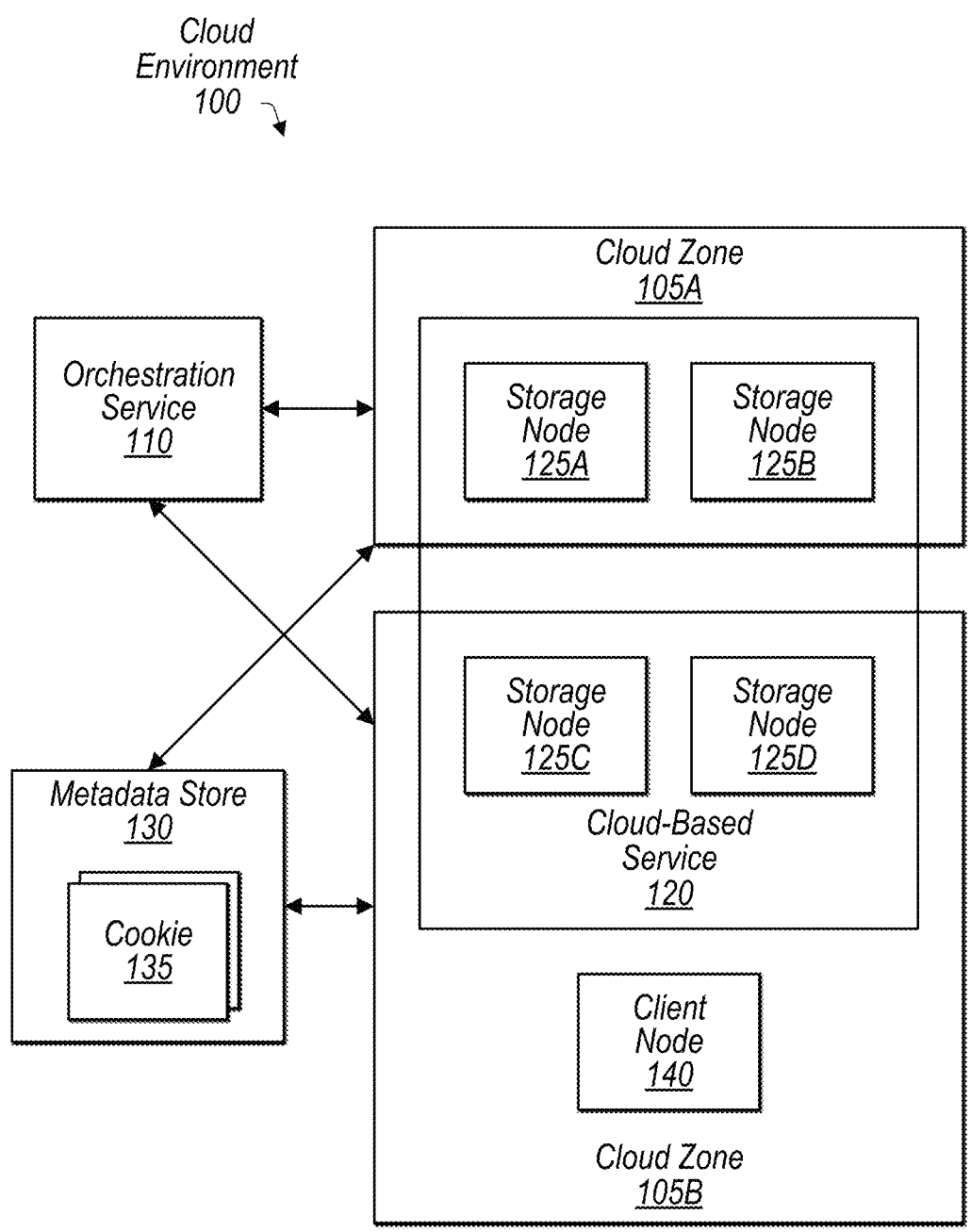
FIG. 1 is a block diagram illustrating example elements of a cloud environment having cloud-based service that includes storage nodes, according to some embodiments.

Cloud computing services (or, simply the "cloud") are growing increasingly popular as companies seek to move their infrastructure into the cloud. As used herein, the term "cloud" is used in accordance with its well-understood meaning and refers to the on-demand availability of computer resources, such as data storage and computing power, that can be made available to one or more organizations over the Internet. One example of a cloud is Amazon Web Services™ (AWS), which is provided by Amazon™ (the provider) to multiple companies (the organizations) to host and run their software. The resources of a public cloud (e.g., computing hardware, storage hardware, etc.) are often spread out over multiple geographical areas (termed "cloud regions"), with each cloud region having multiple, isolated networks of those resources (termed "zones"). Accordingly, a company may instantiate its software on computer systems located within a certain zone of a geographically appropriate cloud region.

As explained, a database system can include database nodes and storage nodes. In many cases, those storage nodes implement a storage service that is not natively designed for a cloud; instead, the storage service is designed for a single centralized network and thus has no concept of cloud regions or zones. Accordingly, a distributed storage service that is distributed across multiple cloud zones might not properly account for cloud zone failures along with the costs associated with communicating across cloud zones in the cloud. In order to account for these issues, it may be desirable to identify and make available information about the locations of the storage nodes within the cloud. For example, a client system running in a particular zone that wishes to access data stored on multiple storage nodes may benefit from accessing the data from a local storage node in the same zone rather than a storage node in a different zone, which reduces cross-zone communication and thus reduces the costs of running in a public cloud. The present disclosure addresses, among other things, the technical problem of identifying and making available location information about the locations of storage nodes within a cloud.

The present disclosure describes various techniques for enabling cloud-based services to discover and make available location information pertaining to components of those cloud-based services. In various embodiments described below, a cloud-based storage service having multiple storage nodes is instantiated across multiple zones in a cloud environment. In various cases, an orchestration service, such as Kubernetes™, is used to instantiate those storage nodes within the different zones. In addition to the cloud-based service, a metadata store may also be instantiated across those zones such that metadata of the cloud-based service is made available locally to the storage nodes of a zone. In various embodiments, when a storage node boots up for the first time, the storage node performs a registration procedure in which it registers itself with the metadata store. As a part of the registration procedure, the storage node may contact the orchestration service in order to obtain location information identifying a region and a zone in which the storage node resides. The storage node may then generate a cookie to include the location information and may store that cookie at the metadata store. In various embodiments, when a client node (e.g., a database node) wishes to access data that is managed by the cloud-based storage service, the client node uses cookies stored at the metadata store to learn about local storage nodes in its zone. The client node may then access the data from a local storage node instead of a distant storage node residing in a separate zone.

A storage node may also store a local copy of its cookie. In various embodiments, when the storage node is restarted (e.g., as a part of an update), the storage node uses the local cookie to validate its cluster membership and other details. Particularly, the storage node may compare its local cookie to the cookie stored at the metadata store. If there is a discrepancy between the cookies, then the storage node does not write data on behalf of the cloud-based service. In some embodiments, an interface is provided for manually modifying cookies so that the discrepancy can be fixed.

These techniques can be advantageous as they allow for information that identifies the locations of components of a cloud-based service to be made available to entities that interact with the cloud-based service. By making this information available, those entities may identify components of the cloud-based service that reside in the same cloud zone. Accordingly, instead of incurring the cost of communicating across cloud zones, the entities can communicate with the local components within their own zone. Moreover, by storing this information in cookies maintained locally and at a shared metadata store, a cloud-based component can verify whether it is a valid member of a cluster of the cloud-based service. This can prevent the cloud-based component from providing services of the cloud-based service for the cases in which it has not been correctly configured/set up. An exemplary application of these techniques will now be discussed, starting with reference to FIG. 1.

Turning now to FIG. 1, a block diagram of example elements of a cloud environment 100 is shown. Cloud environment 100 includes a set of components that may be implemented via hardware or a combination of hardware and software. In the illustrated embodiment, cloud environment 100 includes two cloud zones 105A and 105B, an orchestration service 110, and a metadata store 130. As further shown, cloud zones 105 include storage nodes 125A-D (that together implemented a storage service 120), cloud zone 105B also includes a client node 140, and metadata store 130 includes cookies 135. In some embodiments, cloud environment 100 is implemented differently than shown. For example, orchestration service 110 and/or metadata store 130 may be implemented using nodes residing in cloud zones 105A and 105B. As another example, metadata store 130 may be distributed across cloud zones 105A and 105B such that cookies 135 of metadata store 130 are available locally to that cloud zone 105.

Cloud environment 100, in various embodiments, is a cloud infrastructure that includes various components (e.g., hardware, virtualized resources, storage, and network resources) for providing cloud computing services to users. In some cases, cloud environment 100 may be a public cloud provided by a cloud provider to multiple customers that implements their systems using the various components/resources of the public cloud; in other cases, cloud environment 100 is a private cloud that is available to only select users instead of the general public. In some embodiments, cloud environment 100 is spread across multiple geographical locations and each location may define a "region" of cloud environment 100. A region might include a set of data centers that can be clustered together. Within a region, there may be one or more cloud zones 105. As an example, cloud zones 105A and 105B might be in the same region, although they can be in separate regions. A cloud zone 105, in various embodiments, is a logical or physical grouping of components (e.g., computing resources, storage resources, etc.) in a region. In many cases, the components of a cloud zone 105 are isolated from the failures of components in other cloud zones 105. For example, cloud zone 105A may be a first data center in a certain region and cloud zone 105B may be a second data center in the same region. Cloud zone 105A may be isolated such that a failure at the data center of cloud zone 105B does not affect the data center of cloud zone 105A. In some cases, cloud zones 105A and 105B might be the same data center, but correspond to components on separate networks such that one cloud zone 105 might not be affected by the other cloud zone 105.

Orchestration service 110, in various embodiments, is a set of software routines, which are executable to facilitate the deployment of cloud-based services 120 using the resources of cloud zones 105. Kubernetes™ is one example of an orchestration service 110. Accordingly, orchestration service 110 might deploy containerized applications that implement cloud-based services 120. In some embodiments, orchestration service 110 is associated with a region and thus is responsible for facilitating deployments within the cloud zones 105 of that region. As shown for example, orchestration service 110 interfaces with both cloud zone 105A and 105B and thus can facilitate the deployment of storage nodes 125 and client node 140 within those cloud zones 105. While orchestration service 110 is depicted separately from cloud zones 105, in various embodiments, orchestration service 110 is instantiated within a cloud zone 105 (e.g., cloud zone 105A). Though, orchestration service 110 might be instantiated in one of the cloud zones 105, orchestration service 110 may still facilitate deployments within other cloud zones 105 (e.g., cloud zone 105B). In some embodiments, however, orchestration service 110 may facilitate deployments within only its own cloud zone 105. Accordingly, multiple orchestration services 110 may be instantiated in order to manage deployments for each cloud zone 105 and to allow for a cloud-based service 120 to be distributed across those cloud zones 105, in some cases.

In various embodiments, orchestration service 110 maintains resource information that describes the resources (e.g., processors, storage devices, network ports, virtual machines, etc.) of cloud zones 105 that are accessible to orchestration service 110 for deploying cloud-based services 120. Orchestration service 110 may receive deployment requests (e.g., from an admin of an organization) to deploy cloud-based services 120. In various embodiments, a deployment request include a specification describing what type of cloud-based service 120 to deploy and how it should be deployed (e.g., a storage service should be deployed across at least two cloud zones 105). Based on receiving a deployment request, orchestration service 110 may consider the requirements of the specification and the cloud zone resources available to it for meeting those requirements. Orchestration service 110 may then attempt to deploy the requested cloud-based service 120 using resources of cloud zones 105. In various embodiments, orchestration service 110 stores location information that describes the locations where orchestration service 110 has instantiated components of a cloud-based service 120. As an example, the information may indicate that storage node 125A of the illustrated cloud-based service 120 is instantiated on resources of cloud zone 105A.

A cloud-based service 120, in various embodiments, is a service or system that provides a set of functionality and is deployable on the cloud infrastructure of cloud environment 100. Cloud-based services 120 may include, for example, a distributed storage service, a database management system, an e-mail service, a web application server, etc. In various embodiments, a cloud-based service 120 is implemented by executing a set of program instructions. As such, orchestration service 110 may deploy a cloud-based service 120 to one or more cloud zone 105 by causing it corresponding program instructions to be executed on the resources of those cloud zones 105. In the illustrated embodiment, cloud-based service 120 is a storage service having multiple storage nodes 125 that been instantiated across cloud zones 105A and 105B. In some cases, storage nodes 125 of cloud-based service 120 may form one or more clusters, where the storage nodes 125 of a certain cluster act on behalf of that cluster. For example, storage nodes 125A and 125B may form a first cluster, and storage nodes 125C and 125D may form a second cluster. As another example, storage nodes 125A and 125C may form a cluster. As yet another example, storage nodes 125A-D may all form a single cluster.

A storage node 125, in various embodiments, is a set of software routines executable to implement a storage server that is capable of providing functionality of cloud-based service 120. (In some cases, the hardware used to execute the set of software routines is considered a part of that storage node 125.) A storage node 125 may receive requests to read and write data on behalf of cloud-based service 120 and, in various cases, specifically on behalf of its cluster. As an example, storage node 125C may receive a request from a database application to return data stored on devices managed by storage node 125C. In various embodiments, storage nodes 125 implement data replication practices such that data stored by one storage node 125 is stored by at least one other storage node 125. For example, the data stored by storage node 125A may be stored by storage node 125C. In some cases, portions of that data may be stored on different storage nodes 125 such that a complete copy is not maintained by a single node 125. In various embodiments, stored data is replicated across different cloud zones 105 such that if one cloud zone 105 becomes unavailable, that data is still accessible through another cloud zone 105; or if a particular portion of cloud-based service 120 on a cloud zone 105 becomes unavailable, the data can be accessed through another portion of cloud-based service 120.

Metadata store 130, in various embodiments, is a repository that stores metadata, which can pertain to the operation of cloud-based service 120. The metadata may specify the locations where particular data has been stored in cloud-based service 120. As an example, the metadata may specify that records for a particular key range are stored at storage nodes 125A and 125C. The metadata can further include cookies 135. A cookie 135, in various embodiments, is a data structure that is used to store location information that identifies the location of a corresponding storage node 125 within cloud environment 100. For example, a cookie 135 may indicate that storage node 125C is within cloud zone 105B. In various embodiments, cookies 135 are created by cloud-based service 120 and then stored at metadata store 130. Metadata store 130 may be accessible to various components of cloud environment 100, including client node 140, and as such, cookies 135 may accessed by those components.

As mentioned, orchestration service 110 may store location information that describes the locations where components of cloud-based service 120 have been instantiated. In various embodiments, that location information is obtained by cloud-based service 120, which stores it in cookies 135 at metadata store 130. Storing that location information at metadata store 130 may provide various advantages. Particularly, in various embodiments, metadata store 130 is a distributed service that is spread across cloud zones 105 such that cookies 135 are locally accessible to the components within a given cloud zone 105—that is, each cloud zone 105 may include one of the metadata store instances (which can together implement metadata store 130) that stores a copy of cookies 135. As a result, client node 140 (for example) may not have to issue a cross-cloud-zone request to access cookies 135. Orchestration service 110, however, may not be distributed across cloud zones 105, but may reside within a certain cloud zone 105. Thus, client node 140 may have to incur a performance cost issuing a cross-cloud-zone request in order to access the location information if orchestration service 110 is located in another cloud zone 105 or location. Furthermore, in various embodiments, metadata store 130 is able to scale better than orchestration service 110. Accordingly, as the number of entities accessing the location information increases, metadata store 130 may be better able to efficiently handle a greater volume of requests for that information than orchestration service 110.

Client node 140, in various embodiments, is an entity that interacts with a cloud-based service 120. Client node 140 may be a set of software routines executable to implement another cloud-based service 120, such as a database management system. For example, client node 140 may be a database server that processes database transactions to read and manipulate data and uses storage nodes 125 to ensure that the results of those transactions are stored. Accordingly, client node 140 may interact with metadata store 130 to access cookies 135 and other metadata pertaining to cloud-based service 120. Based on cookies 135 and the other metadata, in various embodiments, client node 140 may identify a storage node 125 within its cloud zone 105 that should store (or stores) particular data that is relevant to client node 140. This may enable client node 140 to access data (that may be stored at multiple storage nodes 125) from a local storage node 125 instead of a remote storage node 125.

Figure 2A:
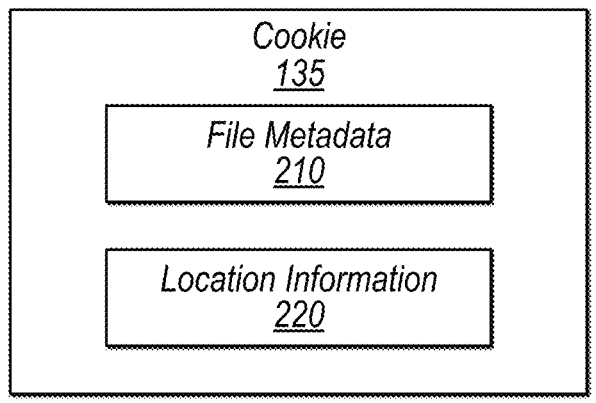
FIG. 2A is a block diagram illustrating example elements of a cookie, according to some embodiments.

Turning now to FIG. 2A, a block diagram of example elements of a cookie 135 is shown. In the illustrated embodiment, cookie 135 includes file metadata 210 and location information 220. In some embodiments, cookie 135 is implemented differently than shown. As an example, cookie 135 may include information specifying a host name and a version of its corresponding storage node 125.

File metadata 210, in various embodiments, includes information that relates to the files that are pertinent to a component of a cloud-based service 120. File metadata 210 may specify file paths for files. For example, a cookie 135 corresponding to a storage node 125 may include file metadata 210 that indicates a set of files that the storage node 125 manages by reading data from and writing data to. File metadata 210, in some embodiments, also specifies information about ledgers that store log records pertinent to a storage node 125. For example, file metadata 210 may indicate a file that stores the latest log records. The corresponding storage node 125 may append new log records to that file indicated by file metadata 210.

Location information 220, in various embodiments, indicates a location of a component of a cloud-based service 120 within cloud environment 100. As mentioned, cloud environment 100 may be spread across multiple regions, with a given region having one or more cloud zones 105. Accordingly, in various embodiments, location information 220 specifies a region and a cloud zone 105 of the component. For example, a cookie 135 corresponding to a storage node 125 may include location information 220 that indicates that the storage node 125 is located in a cloud zone 105 "NA-01" of the North American region. But, in some embodiments, location information 220 specifies only a cloud zone 105 as the corresponding cookie 135 may be stored only within the region having that cloud zone 105 and thus be specific to that region. In some embodiments, a storage node 125 may be moved to a different cloud zone 105. Consequently, the location information 220 for that storage node 125 may be updated to reflect the new cloud zone location.

Figure 2B:
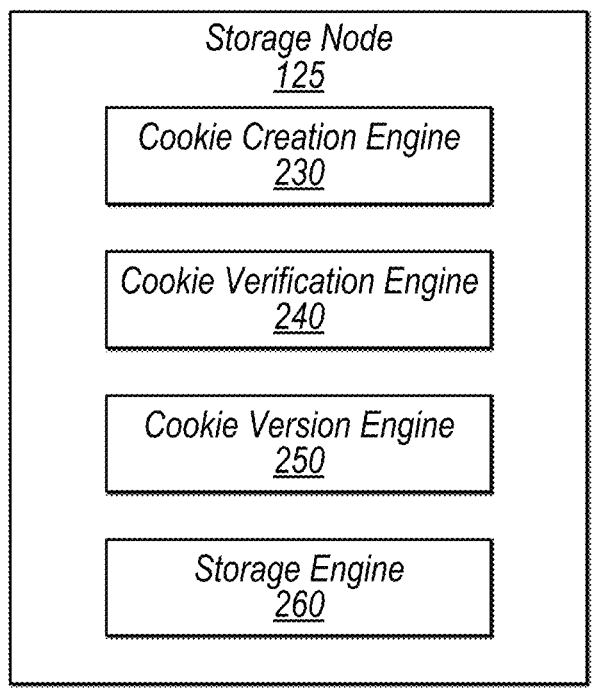
FIG. 2B is a block diagram illustrating example elements of a storage node, according to some embodiments.

Turning now to FIG. 2B, a block diagram of example elements of a storage node 125 is shown. In the illustrated embodiment, storage node 125 includes a cookie creation engine 230, a cookie verification engine 240, a cookie version engine 250, and a storage engine 260. In some embodiments, storage node 125 is implemented differently than shown. As an example, storage node 125 may not include cookie version engine 250.

Cookie creation engine 230, in various embodiments, is a set of software routines that is executable to generate and then store a cookie 135 at the local storage node 125 and metadata store 130. In some embodiments, cookie creation engine 230 is used to generate a cookie 135 when its storage node 125 is booted up for the first time. For subsequent re-boots, storage node 125 may access its cookie 135 (if it was lost) from metadata store 130 instead of generating a second cookie 135. In order to generate a cookie 135, in various embodiments, cookie creation engine 230 interacts with orchestration service 110 to obtain location information 220. Cookie creation engine 230 may then generate a cookie 135 and store location information 220 in that cookie 135. Thereafter, in various embodiments, cookie creation engine 230 maintains a local copy of that cookie 135 and interacts metadata store 130 to store another copy of that cookie 135. In some cases, cookie creation engine 230 may generate that cookie 135 to have a specific version. An example interaction in which a cookie 135 is generated and used is discussed in greater detail with respect to FIG. 3.

Cookie verification engine 240, in various embodiments, is a set of software routines executable to perform a verification process to verify that a storage node 125 is a valid member of a cluster of its cloud-based service 120. In various embodiments, cookie verification engine 240 performs the verification process when its storage node 125 is being booted up. Based on the outcome of the verification process, cookie verification engine 240 may prevent its storage node 125 from completing the boot up and writing records on behalf of its cloud-based service 120. Consider an example in which a storage node 125 is updated to a new version. When that storage node 125 restarts and boots up, cookie verification engine 240 may compare its locally stored cookie 135 with the corresponding cookie 135 stored at metadata store 130. If there is a mismatch between their information, this may indicate that the state of the cloud-based service 120 has changed in a manner that is not expected by the storage node 125. Accordingly, cookie verification engine 240 may halt the boot-up process. Examples of the verification/restart process are discussed in greater detail with respect to FIGS. 4A and 4B.

Cookie version engine 250, in various embodiments, is a set of software routines that is executable to identify the version of its storage node's cookie 135 and configure the storage node 125 based on the identified version. In various embodiments, cookie version engine 250 configures its storage node 125 during the boot-up process. Particularly, a cookie 135 may be associated with a version that is specific to cloud environment 100 or a version that is specific to a non-cloud infrastructure (e.g., a company's internal network, which is not a cloud and does not have a concept of cloud zones 105). Accordingly, cookie version engine 250 may check its storage node's cookie 135 to identify which version is indicated. If the cookie 135 indicates a version linked to the cloud, then cookie version engine 250 may configure its storage node 125 to operate in the cloud—e.g., cookie version engine 250 may configure its storage node 125 to make use of operations designed for a service distributed across cloud zones 105. If the cookie 135 indicates a version linked to non-cloud infrastructure, then cookie version engine 250 may configure its storage node 125 to operate as if there are no cloud zones 105. Storage node 125 may ignore location information 220 if it is operating in a non-cloud infrastructure.

Storage engine 260, in various embodiments, is a set of software routines executable to perform storage operations associated with a storage server. As an example, storage node 125 may receive requests from a client node 140 to store a set of database records. Consequently, storage engine 260 may store those records on a single or multiple storage devices connected together on a network (e.g., a storage attached network (SAN)) and configured to redundantly store information to prevent data loss. The storage devices may store data persistently and thus a database built on them may serve as a persistent storage for components of cloud environment 100. In some embodiments, storage engine 260 assists in managing a database built around a log-structured merge tree (LSM tree). Accordingly, storage engine 260 may store data files for the different levels of the LSM and corresponding log files having log records of transactional logs. Storage engine 260 may also return stored data in response to requests from components, such as client node 140.

Figure 3:
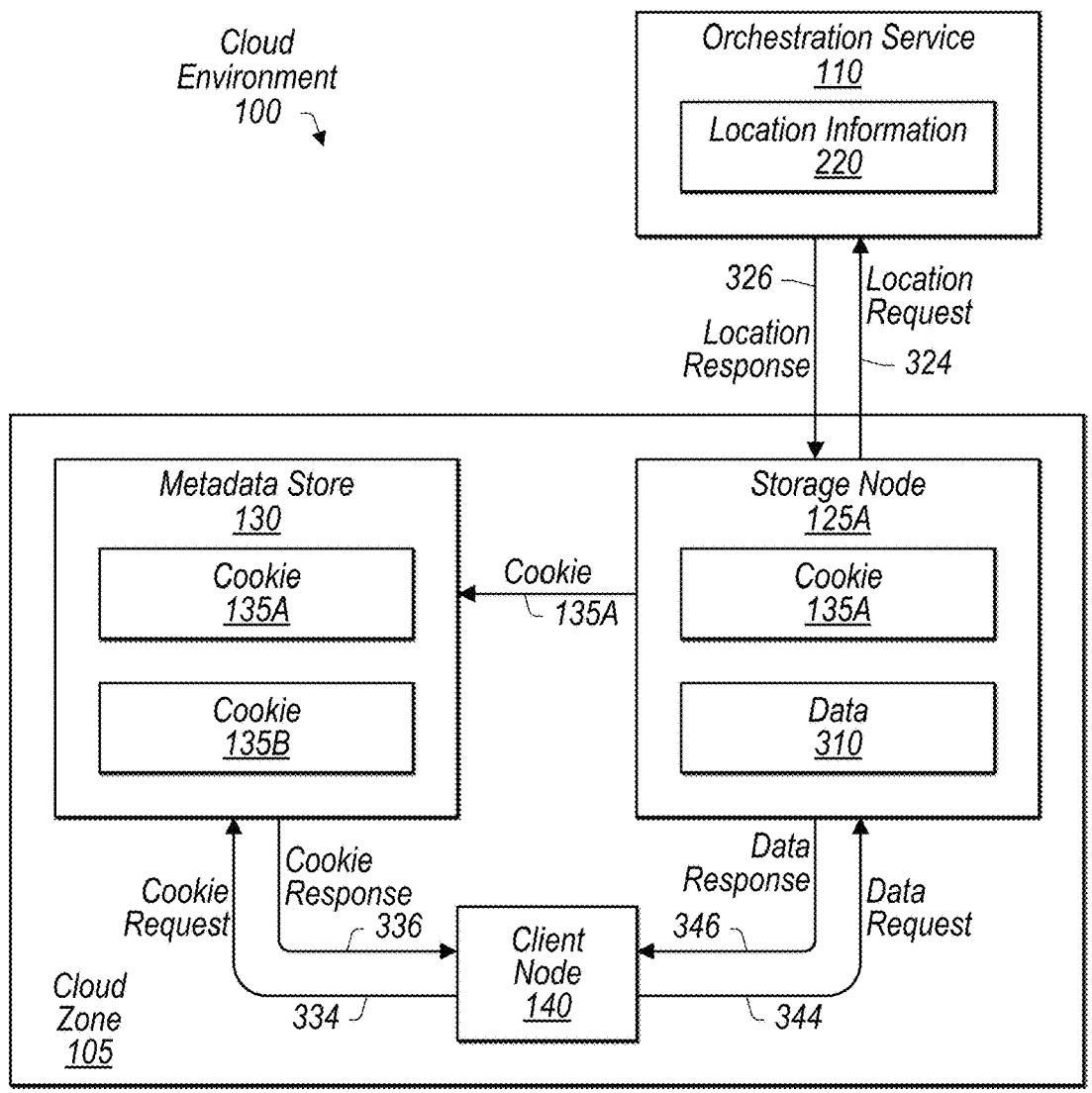
FIG. 3 is a block diagram illustrating an example interaction in which a cookie is created by a storage node and used by a client node, according to some embodiments.

Turning now to FIG. 3, a block diagram of an example interaction in which a cookie 135 is generated by a storage node 125 and used by a client node 140 is shown. In the illustrated embodiment, cloud environment 100 includes: orchestration service 110; a cloud zone 105 that has storage node 125A, metadata store 130, and client node 140; and storage node 125B. Also as shown, orchestration service 110 includes location information 220, storage nodes 125A and 125B include data 310 and respective cookies 135, and metadata store 130 includes a copy of those cookies 135 (i.e., cookie 135A and 135B). In some embodiments, cloud environment 100 is implemented differently than shown. For example, orchestration service 110 may be a part of the illustrated cloud zone 105.

As mentioned, in various embodiments, when a storage node 125 is initialized for the first time, the storage node 125 generates a cookie 135. To generate the cookie 135, the storage node 125 may interface with orchestration service 110 to obtain location information 220. As shown, storage node 125A sends a location request 324 to orchestration service 110. Location request 324, in various embodiments, includes an identifier (e.g., a host name) indicative of a storage node 125. Accordingly, orchestration service 110 may look up, based on the identifier, location information 220 that corresponds to that storage node 125. Orchestration service 110 may then return that information in a location response 326, as shown.

In various embodiments, a storage node 125 is able to obtain location information 220, via a location request 324, without providing authentication credentials. Because orchestration service 110 deployed storage node 125A, orchestration service 110 can store information (e.g., network addresses, ports, etc.) that allows for orchestration service 110 to know that location request 324 is a valid request that originates from storage node 125A. As a result, storage node 125A can obtain location information 220 without providing authentication credentials. This may be advantageous over querying (e.g., via a REST request) a cloud provider component of cloud environment 100 to obtain endpoint information as it involves providing authentication credentials to the cloud provider component. Further, by interfacing with orchestration service 110 to obtain location information 220 instead of a cloud provider component, a storage node 125 does not have to be designed for each unique cloud environment 100—that is, the storage node 125 can be cloud agnostic with regards to obtaining location information. But, in some embodiments, a storage node 125 interfaces with a cloud provider component in order to obtain endpoint information.

After receiving location information 220, storage node 125A generates a cookie 135A that includes location information 220. In some cases, a cookie 135 may include a location field that is set by a storage node 125 to the region and the cloud zone 105 in which the storage node 125 resides. Accordingly, cookie 135A identifies the illustrated cloud zone 105. After generating cookie 135A, storage node 125A sends a copy of cookie 135A to metadata store 130 and stores a local copy of cookie 135A as shown. Storage node 125B may perform the same process and store a cookie 135B at metadata store 130 as shown. In some cases, storage node 125B may be associated with a different namespace than one associated with storage node 125A and client node 140. Storage node 125A and client node 140, however, may obtain cookie 135B and thus storage node 125B's location even in the cases in which storage node 125B is associated with a different namespace.

As shown, client node 140 sends a cookie request 334 to metadata store 130. In various cases, client node 140 may wish to access data 310. Accordingly, client node 140 may issue cookie request 334 to cause metadata store 130 to return information that describes the storage of data 310. That information may identify, for example, which storage nodes 125 store data 310 and include associated cookies 135. In the illustrated embodiment, storage nodes 125A and 125B store data 310 and thus client node 140 receives a cookie response 336 that identifies storage nodes 125A and 125B and includes cookies 135A and 135B. Based on cookies 135A and 135B, client node 140 may determine whether there is a storage node 125 within the same cloud zone 105 as it that stores data 310. For the illustrated embodiment, client node 140 determines that storage node 125A and not storage node 125B is in its cloud zone 105. As a result, client node 140 sends a data request 344 to storage node 125A for data 310 instead of to storage node 125B as storage node 125B resides in a different cloud zone 105. Storage node 125A then provides a data response 346 to client node 140 that may include data 310.

Figure 4A:
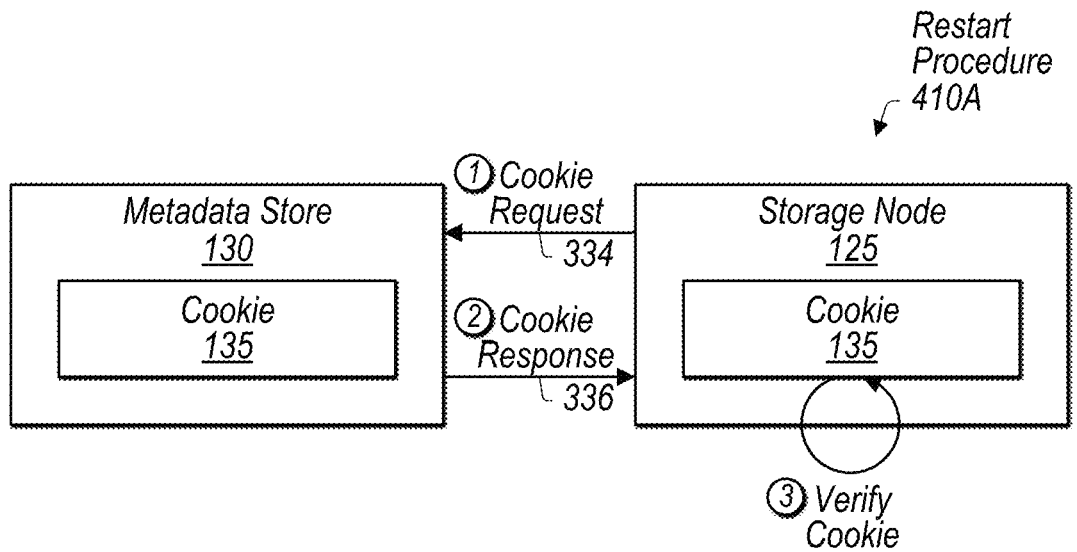
FIGS. 4A and 4B are block diagrams illustrating example elements of different restart procedures performed by a storage node, according to some embodiments.

Turning now to FIG. 4A, a block diagram of an example restart procedure 410A that is performed by a storage node 125 is shown. In the illustrated embodiment, restart procedure 410A involves storage node 125 and metadata store 130. As further shown, storage node 125 includes a cookie 135 and metadata store 130 includes a cookie 135. In some embodiments, storage node 125 may implement another restart procedure 410, such as the one discussed in greater detail with respect to FIG. 4B.

During operation, storage node 125 may be restarted, e.g., as part of a rolling update of storage node 125. As part of restarting, storage node 125 may perform restart procedure 410A if the storage node's cookie 135 (which may have been stored during its creation) is still stored on a local disk of storage node 125; otherwise, storage node 125 may perform restart procedure 410B shown in FIG. 4B. That is, if storage node 125 has not lost its cookie 135 (e.g., as a result of a system crash), then storage node 125 may perform restart procedure 410A.

In various embodiments, the cookie 135 of storage node 125 is cross-checked against the cookie 135 of metadata store 130 to verify whether storage node 125 is a valid member of its cluster. Accordingly, as depicted, storage node 125 issues a cookie request 334 to metadata store 130 for the cookie 135 stored at metadata store 130. Cookie request 334 may specify an identifier (e.g., a host name) of storage node 125 that metadata store 130 may use to locate the cookie 135 associated with storage node 125. Metadata store 130 may then return the cookie 135 of metadata store 130 to storage node 125 via a cookie response 336. Thereafter, in various embodiments, storage node 125 verifies its own cookie 135 by comparing its information with information included in the cookie 135 stored at metadata store 130. If the cookies 135 match, then storage node 125 may determine that it is a valid member of the cluster and begin writing data on behalf of the cluster (e.g., storage node 125 may process storage requests from client node 140). If the cookies 135 do not match, then storage node 125 may determine that it is not a valid member of the cluster and cease restarting/booting up. For example, if the cookie 135 of storage node 125 has become corrupted such that its location field indicates a different cloud zone 105 than the cookie 135 of metadata store 130, then storage node 125 may shutdown.

In various embodiments, in response to a mismatch, storage node 125 outputs a log that identifies the mismatch so that it can be corrected. In some embodiments, cloud-based service 120 provides an interface (e.g., a command line tool) that allows a user to update cookies 135 stored at storage nodes 125 and metadata store 130. Accordingly, a user may use the interface to correct the mismatch identified in the log. As an example, a user may update the cookie 135 of storage node 125 to identify the correct cloud zone 105. In some embodiments, the interface is capable of listing cookies 135 stored at storage nodes 125 and metadata store 130 so that the user can determine where each storage node 125 is located (e.g., which cloud zone 105).

In various cases, storage node 125 may generate a cookie 135 upon every initialization of storage node 125, which it compares with the locally stored cookie 135 as well as the cookie 135 stored at metadata store 130. Accordingly, for restart procedure 410A for example, storage node 125 may communicate with orchestration service 110 to obtain location information 220 that it uses to create a cookie 135. Storage node 125 may then compare the created cookie 135 with its locally stored cookie 135 in order to determine whether there is a mismatch indicating that storage node 125 is not a valid member of a particular cluster. If there is not a mismatch, then storage node 125 may obtain the cookie 135 that is stored at metadata store 130 via cookie request 334 and cookie response 336. Storage node 125 may compare the created cookie 135 with that received cookie 135 to determine if there is a mismatch. If there is not a mismatch, then storage node 135 may complete its initialization. By generating a new cookie 135 upon each initialization and comparing it with the locally stored cookie 135 and the cookie 135 that is at metadata store 130, storage node 130 can determine if it has been moved to another cloud zone 105 (e.g., by comparing the generated cookie 135 with the cookie 135 that is at metadata store 130) and/or whether there is data corruption at the disk associated with storage node 130 (e.g., by comparing the generated cookie 135 with the locally stored cookie 135).

Figure 4B:
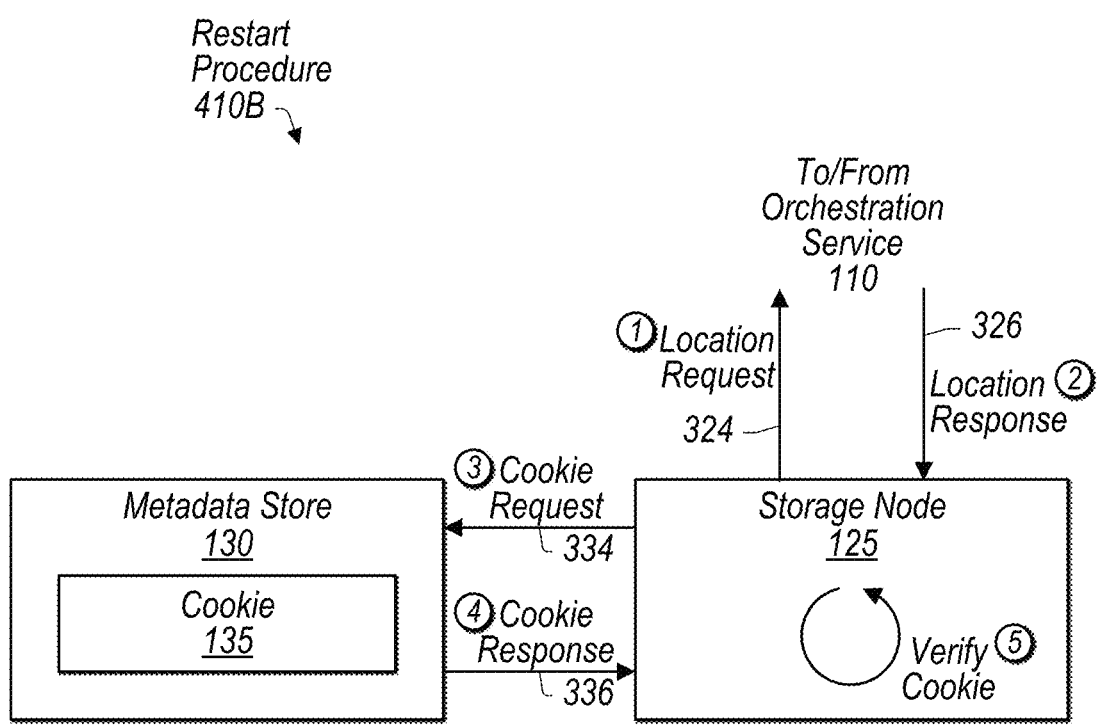

Turning now to FIG. 4B, a block diagram of an example restart procedure 410B that is performed by a storage node 125 is shown. In the illustrated embodiment, restart procedure 410B involves storage node 125 and metadata store 130. As further shown, metadata store 130 includes a cookie 135, but storage node 125 does not. In some embodiments, restart procedure 410B is implemented differently than shown. For example, storage node 125 may issue cookie request 334 before location request 324.

As mentioned, storage node 125 may perform restart procedure 410B as part of a restart process in event that storage node 125 has lost its cookie 135. As illustrated, storage node 125 issues a location request 324 to orchestration service 110 and receives a location response 326 that can include location information 220. Storage node 125 then issues a cookie request 334 to metadata store 130 and receives a cookie response 336 that can include cookie 135. Storage node 125, in various embodiments, verifies the cookie 135 of metadata store 130 by comparing its information with the location information 220 received from orchestration service 110. If they match, then storage node 125 may determine that it is a valid member of the cluster and begin writing data on behalf of the cluster (e.g., storage node 125 may process storage requests from client node 140). Storage node 125 may also store cookie 135. If they do not match, then storage node 125 may determine that it is not a valid member of the cluster and cease the restart process. In various embodiments, in response to a mismatch, storage node 125 outputs a log that identifies the mismatch so that it can be corrected.

Figure 5:
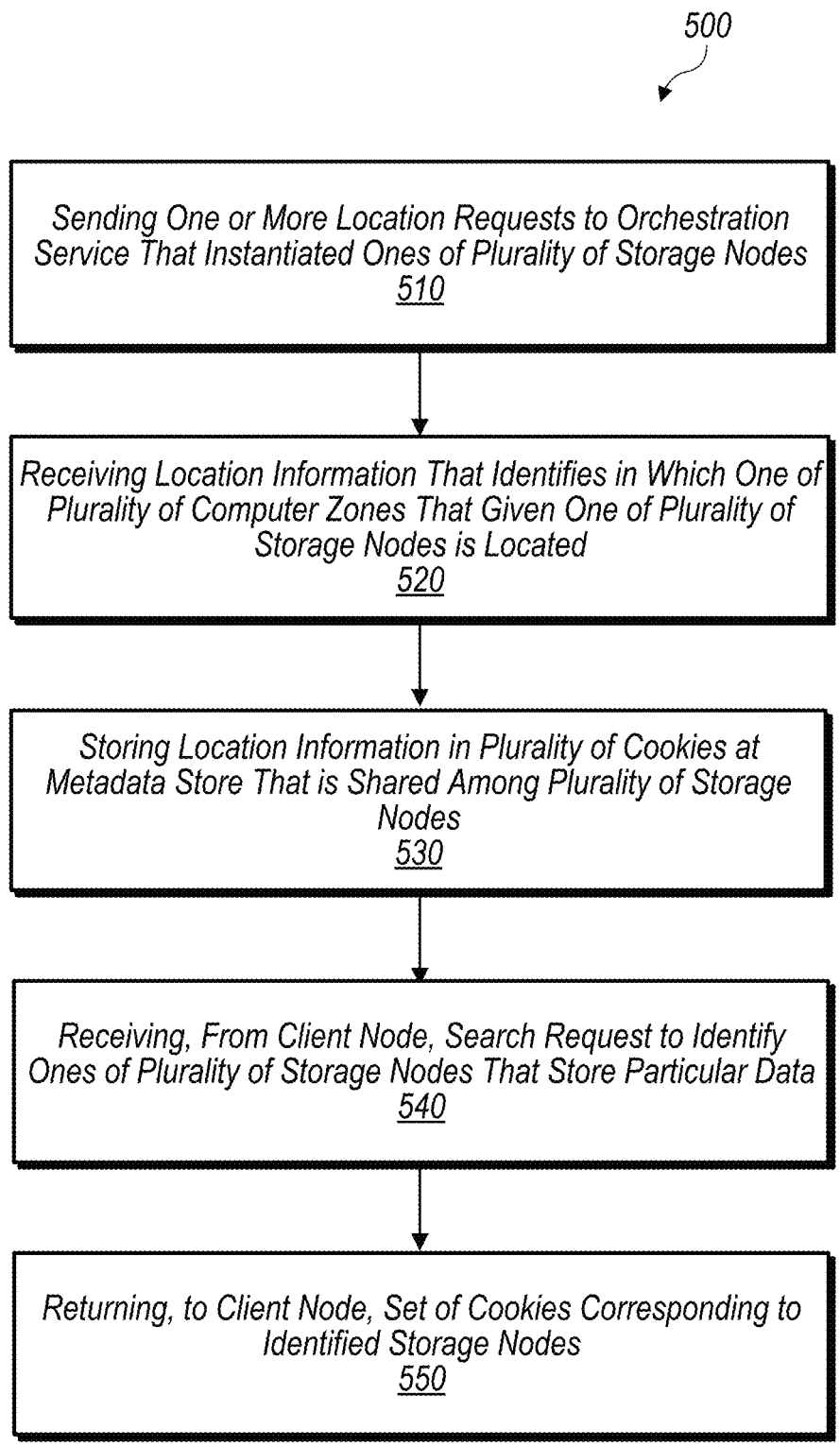
FIG. 5-6 are flow diagrams illustrating example methods that relate to creating cookies having storage node location information, according to some embodiments.

Turning now to FIG. 5, a flow diagram of a method 500 is shown. Method 500 is one embodiment of a method performed by a cloud-based service (e.g., cloud-based service 120) to obtain and make available location information (e.g., location information 220) to client and storage nodes (e.g., client nodes 140 and storage nodes 125). Method 500 may be performed by executing a set of program instructions that is stored on a non-transitory computer-readable medium. In some embodiments, method 500 includes more or less steps than shown. For example, method 500 may include an additional step in which a user interface is presented to a user for modifying a cookie that stores location information.

Method 500 begins in step 510 with the cloud-based service sending location requests (e.g., location requests 324) to an orchestration service (e.g., orchestration service 110) that instantiated ones of a plurality of storage nodes that make up the cloud-based service. In many cases, the plurality of storage nodes may be distributed across a plurality of separate computer zones (e.g., cloud zones 105A and 105B). In some embodiments, the plurality of storage nodes are distributed across those computer zones such that at least a threshold number of storage nodes are within a given one of the plurality of computer zones (e.g., four storage nodes per computer zone). In some cases, the location requests may include storage node identifiers for the plurality of storage nodes.

In step 520, the cloud-based service receives location information that identifies in which one of the plurality of computer zones that a given one of the plurality of storage nodes is located. Receiving the location information may include receiving location responses (e.g., location responses 326) to location requests.

In step 530, the cloud-based service stores the location information in a plurality of cookies (e.g., cookies 135) at a metadata store (e.g., metadata store 130) that is shared among the plurality of storage nodes. The storing may include a particular storage node generating a corresponding one of the plurality of cookies that includes location information for the storage node and storing the cookie both locally and at the metadata store. In various embodiments, the metadata store is distributed across the plurality of computer zones such that each computer zone includes an instance of the metadata store having the plurality of cookies.

Subsequent to the particular storage node being restarted (e.g., as a part of an update), the cloud-based service may perform a comparison of the cookie stored locally at the particular storage node with the cookie stored at the metadata store. Based on the comparison indicating a match, the cloud-based service may then determine that the particular storage node is a valid member of the storage cluster and thus is permitted to write data to a database of the cloud-based service. In some instances, subsequent to the particular storage node being restarted, the particular storage node may determine that the locally stored cookie has been lost. As such, the particular storage node may access, from the orchestration service, location information that identifies a particular one of the plurality of computer zones in which the particular storage node is located. The particular storage node may also access the cookie stored at the metadata store and perform a comparison of the computer zone identified from the orchestration service with a computer zone identified by the accessed cookie. Based on the comparison indicating a match, the particular storage node may store the cookie locally again. In some embodiments, the particular storage node determines, based on a version of the cookie, whether the particular storage node is running in a cloud environment (e.g., cloud environment 100).

In step 540, the cloud-based service receives, from a client node a search request (e.g., a cookie request 334) to identify ones of the plurality of storage nodes that store particular data. In step 550, the cloud-based service returns, to the client node, a set of cookies corresponding to the identified storage nodes. The set of cookies may enable the client node to determine if there is a storage node that stores the particular data and is within the same computer zone as the client node. In some cases, the set of cookies includes a cookie that corresponds to a storage node associated with a different namespace than the client node.

Figure 6:
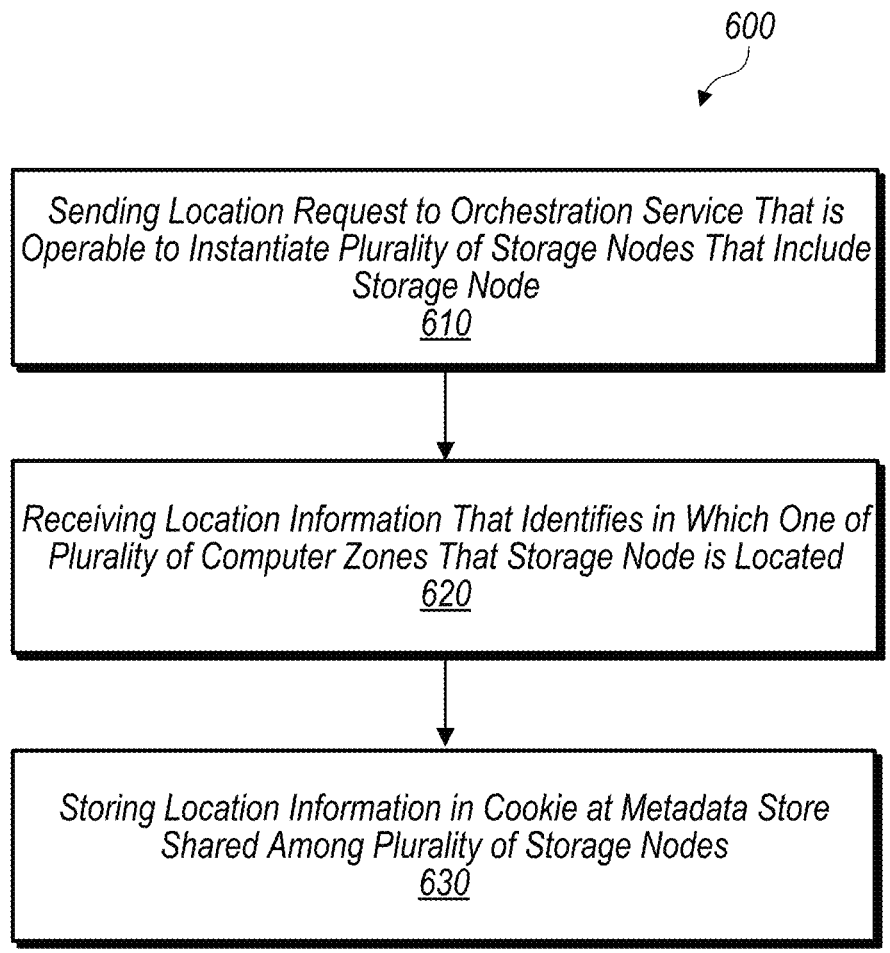

Turning now to FIG. 6, a flow diagram of a method 600 is shown. Method 600 is one embodiment of a method performed by a storage node (e.g., a storage node 125) to obtain and make available location information (e.g., location information 220) to client and storage nodes (e.g., client nodes 140 and storage nodes 125). Method 600 may be performed by executing a set of program instructions that is stored on a non-transitory computer-readable medium. In some embodiments, method 600 includes more or less steps than shown. For example, method 600 may include an additional step in which a user interface is presented to a user for modifying a cookie that stores location information.

Method 600 begins in step 610 with the storage node sending a location request (e.g., a location request 324) to an orchestration service (e.g., orchestration service 110) that is operable to instantiate a plurality of storage nodes that include the storage node. In some cases, the plurality of storage nodes may be distributed across a plurality of separate computer zones (e.g., cloud zones 105A and 105B) of a cloud system. In some embodiments, the location request to the orchestration service is sent without including authorization credentials that are usable to validate the storage node.

In step 620, the storage node receives location information that identifies in which one of the plurality of computer zones that the storage node is located. In step 630, the storage node stores the location information in a cookie (e.g., a cookie 135) at a metadata store (e.g., metadata store 130) shared among the plurality of storage nodes. In various cases, the metadata store includes a plurality of cookies corresponding to the plurality of storage nodes. A client node may be operable, when sending data requests for particular data, to identify, from ones of the plurality of storage nodes based on the plurality of cookies, a storage node that stores the particular data and is within the same computer zone as the client node. In some embodiments, the storage node stores the cookie locally. Subsequent to being restarted, the storage node may perform an initialization procedure (e.g., restart procedure 410A) that includes performing a comparison of the cookie stored locally at the storage node with the cookie that is stored at the metadata store. The storage node may cease performance of the initialization procedure based on the comparison indicating a mismatch.

The sending, receiving, and storing may be performed as part of an initial boot up of the storage node. Subsequent to the storage node being restarted and the locally stored cookie being lost, the storage node may access the cookie that is stored at the metadata store instead of performing the sending, receiving, and storing again. In various embodiments, the storage node causes a user interface to be presented to a user that enables the user to make changes to the plurality of cookies. Accordingly, the storage node may receive, from the user via the user interface, user input to update the cookie stored at the metadata store such that the updated cookie stored at the metadata store matches the cookie stored locally at the storage node.

Exemplary Multi-Tenant Database System

Figure 7:
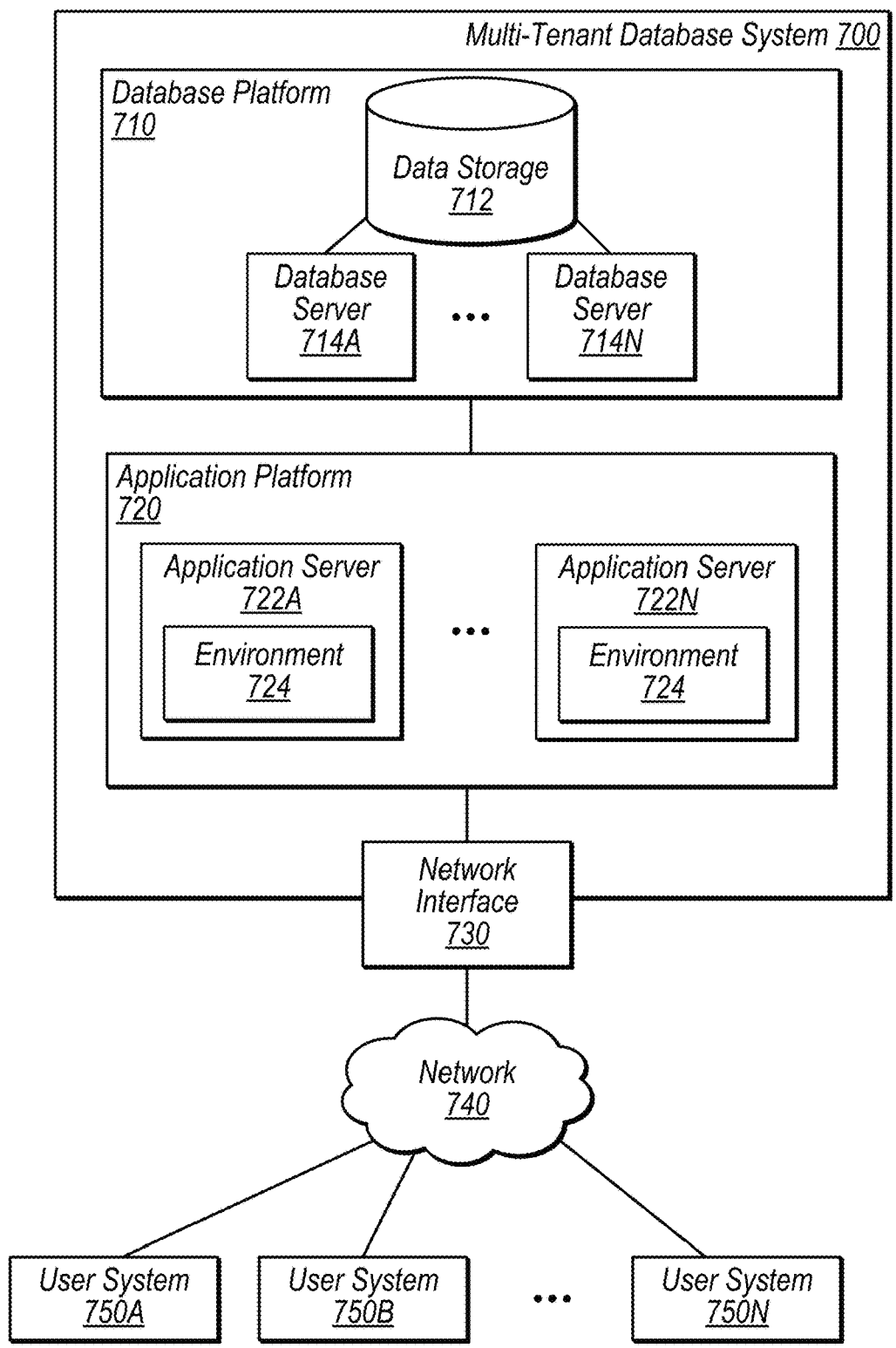
FIG. 7 is a block diagram illustrating elements of a multi-tenant system that may be implemented in a cloud environment, according to some embodiments.

Turning now to FIG. 7, an exemplary multi-tenant database system (MTS) 700 in which various techniques of the present disclosure can be implemented is shown. In FIG. 7, MTS 700 includes a database platform 710, an application platform 720, and a network interface 730 connected to a network 740. Also as shown, database platform 710 includes a data storage 712 and a set of database servers 714A-N that interact with data storage 712, and application platform 720 includes a set of application servers 722A-N having respective environments 724. In the illustrated embodiment, MTS 700 is connected to various user systems 750A-N through network 740. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 700, in various embodiments, is a set of computer systems that together provide various services to users (alternatively referred to as "tenants") that interact with MTS 700. In some embodiments, MTS 700 implements a customer relationship management (CRM) system that provides mechanism for tenants (e.g., companies, government bodies, etc.) to manage their relationships and interactions with customers and potential customers. For example, MTS 700 might enable tenants to store customer contact information (e.g., a customer's website, email address, telephone number, and social media data), identify sales opportunities, record service issues, and manage marketing campaigns. Furthermore, MTS 700 may enable those tenants to identify how customers have been communicated with, what the customers have bought, when the customers last purchased items, and what the customers paid. To provide the services of a CRM system and/or other services, as shown, MTS 700 includes a database platform 710 and an application platform 720.

Database platform 710, in various embodiments, is a combination of hardware elements and software routines that implement database services for storing and managing data of MTS 700, including tenant data. As shown, database platform 710 includes data storage 712. Data storage 712, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 712 is used to implement a database comprising a collection of information that is organized in a way that allows for access, storage, and manipulation of the information. Data storage 712 may implement a single database, a distributed database, a collection of distributed databases, a database with redundant online or offline backups or other redundancies, etc. As part of implementing the database, data storage 712 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 700 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 712 (e.g., a storage implemented by storage nodes 125) is organized as part of a log-structured merge-tree (LSM tree). An LSM tree normally includes two high-level components: an in-memory buffer and a persistent storage. In operation, a database server 714 may initially write database records into a local in-memory buffer before later flushing those records to the persistent storage (e.g., data storage 712). As part of flushing database records, the database server 714 may write the database records into new files that are included in a "top" level of the LSM tree. Over time, the database records may be rewritten by database servers 714 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 712.

When a database server 714 wishes to access a database record for a particular key, the database server 714 may traverse the different levels of the LSM tree for files that potentially include a database record for that particular key. If the database server 714 determines that a file may include a relevant database record, the database server 714 may fetch the file from data storage 712 into a memory of the database server 714. The database server 714 may then check the fetched file for a database record having the particular key. In various embodiments, database records are immutable once written to data storage 712. Accordingly, if the database server 714 wishes to modify the value of a row of a table (which may be identified from the accessed database record), the database server 714 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 714, in various embodiments, are hardware elements, software routines, or a combination thereof capable of providing database services, such as data storage, data retrieval, and/or data manipulation. A database server 714 is an example of a client node 140. Such database services may be provided by database servers 714 to components (e.g., application servers 722) within MTS 700 and to components external to MTS 700. As an example, a database server 714 may receive a database transaction request from an application server 722 that is requesting data to be written to or read from data storage 712. The database transaction request may specify an SQL SELECT command to select one or more rows from one or more database tables. The contents of a row may be defined in a database record and thus database server 714 may locate and return one or more database records that correspond to the selected one or more table rows. In various cases, the database transaction request may instruct database server 714 to write one or more database records for the LSM tree-database servers 714 maintain the LSM tree implemented on database platform 710. In some embodiments, database servers 714 implement a relational database management system (RDMS) or object oriented database management system (OODBMS) that facilitates storage and retrieval of information against data storage 712. In various cases, database servers 714 may communicate with each other to facilitate the processing of transactions. For example, database server 714A may communicate with database server 714N to determine if database server 714N has written a database record into its in-memory buffer for a particular key.

Application platform 720, in various embodiments, is a combination of hardware elements and software routines that implement and execute CRM software applications as well as provide related data, code, forms, web pages and other information to and from user systems 750 and store related data, objects, web page content, and other tenant information via database platform 710. In order to facilitate these services, in various embodiments, application platform 720 communicates with database platform 710 to store, access, and manipulate data. In some instances, application platform 720 may communicate with database platform 710 via different network connections. For example, one application server 722 may be coupled via a local area network and another application server 722 may be coupled via a direct network link. Transfer Control Protocol and Internet Protocol (TCP/IP) are exemplary protocols for communicating between application platform 720 and database platform 710, however, it will be apparent to those skilled in the art that other transport protocols may be used depending on the network interconnect used.

Application servers 722, in various embodiments, are hardware elements, software routines, or a combination thereof capable of providing services of application platform 720, including processing requests received from tenants of MTS 700. Application servers 722, in various embodiments, can spawn environments 724 that are usable for various purposes, such as providing functionality for developers to develop, execute, and manage applications (e.g., business logic). Data may be transferred into an environment 724 from another environment 724 and/or from database platform 710. In some cases, environments 724 cannot access data from other environments 724 unless such data is expressly shared. In some embodiments, multiple environments 724 can be associated with a single tenant.

Application platform 720 may provide user systems 750 access to multiple, different hosted (standard and/or custom) applications, including a CRM application and/or applications developed by tenants. In various embodiments, application platform 720 may manage creation of the applications, testing of the applications, storage of the applications into database objects at data storage 712, execution of the applications in an environment 724 (e.g., a virtual machine of a process space), or any combination thereof. In some embodiments, application platform 720 may add and remove application servers 722 from a server pool at any time for any reason, there may be no server affinity for a user and/or organization to a specific application server 722. In some embodiments, an interface system (not shown) implementing a load balancing function (e.g., an F5 Big-IP load balancer) is located between the application servers 722 and the user systems 750 and is configured to distribute requests to the application servers 722. In some embodiments, the load balancer uses a least connections algorithm to route user requests to the application servers 722. Other examples of load balancing algorithms, such as are round robin and observed response time, also can be used. For example, in certain embodiments, three consecutive requests from the same user could hit three different servers 722, and three requests from different users could hit the same server 722.

In some embodiments, MTS 700 provides security mechanisms, such as encryption, to keep each tenant's data separate unless the data is shared. If more than one server 714 or 722 is used, they may be located in close proximity to one another (e.g., in a server farm located in a single building or campus), or they may be distributed at locations remote from one another (e.g., one or more servers 714 located in city A and one or more servers 722 located in city B). Accordingly, MTS 700 may include one or more logically and/or physically connected servers distributed locally or across one or more geographic locations.

One or more users (e.g., via user systems 750) may interact with MTS 700 via network 740. User system 750 may correspond to, for example, a tenant of MTS 700, a provider (e.g., an administrator) of MTS 700, or a third party. Each user system 750 may be a desktop personal computer, workstation, laptop, PDA, cell phone, or any Wireless Access Protocol (WAP) enabled device or any other computing device capable of interfacing directly or indirectly to the Internet or other network connection. User system 750 may include dedicated hardware configured to interface with MTS 700 over network 740. User system 750 may execute a graphical user interface (GUI) corresponding to MTS 700, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 750 to access, process, and view information and pages available to it from MTS 700 over network 740. Each user system 750 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 700 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 750 may be users in differing capacities, the capacity of a particular user system 750 might be determined one or more permission levels associated with the current user. For example, when a salesperson is using a particular user system 750 to interact with MTS 700, that user system 750 may have capacities (e.g., user privileges) allotted to that salesperson. But when an administrator is using the same user system 750 to interact with MTS 700, the user system 750 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 700 that are allocated at the tenant level while other data structures are managed at the user level.

In some embodiments, a user system 750 and its components are configurable using applications, such as a browser, that include computer code executable on one or more processing elements. Similarly, in some embodiments, MTS 700 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 740 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 750 may communicate with MTS 700 using TCP/IP and, at a higher network level, use other common Internet protocols to communicate, such as HTTP, FTP, AFS, WAP, etc. For example, where HTTP is used, user system 750 might include an HTTP client commonly referred to as a "browser" for sending and receiving HTTP messages from an HTTP server at MTS 700. Such a server might be implemented as the sole network interface between MTS 700 and network 740, but other techniques might be used as well or instead. In some implementations, the interface between MTS 700 and network 740 includes load sharing functionality, such as round-robin HTTP request distributors to balance loads and distribute incoming HTTP requests evenly over a plurality of servers.

In various embodiments, user systems 750 communicate with application servers 722 to request and update system-level and tenant-level data from MTS 700 that may require one or more queries to data storage 712. In some embodiments, MTS 700 automatically generates one or more SQL statements (the SQL query) designed to access the desired information. In some cases, user systems 750 may generate requests having a specific format corresponding to at least a portion of MTS 700. As an example, user systems 750 may request to move data objects into a particular environment 724 using an object notation that describes an object relationship mapping (e.g., a JavaScript object notation mapping) of the specified plurality of objects.

Exemplary Computer System

Figure 8:
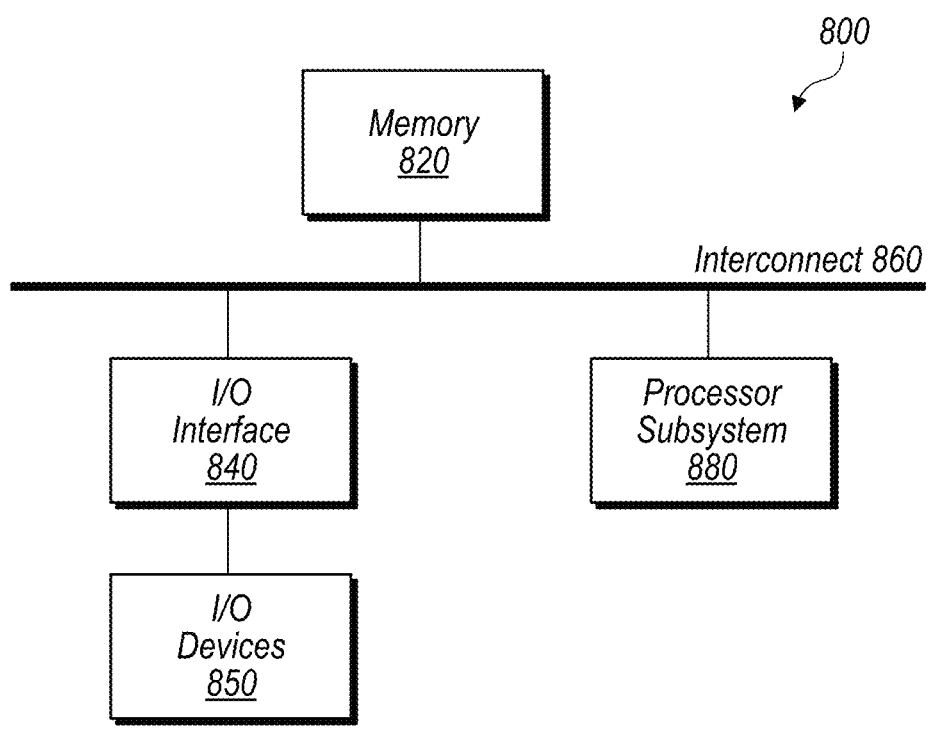
FIG. 8 is a block diagram illustrating elements of a computer system for implementing various systems described in the present disclosure, according to some embodiments.

Turning now to FIG. 8, a block diagram of an exemplary computer system 800, which may implement orchestration service 110, storage nodes 125, metadata store 130, MTS 700, and/or user system 750, is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement cookie creation engine 230, cookie verification engine 240, cookie version engine 250, and storage engine 260 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
    determining, by a client node implemented by a computer system, to access particular data that is stored by a cloud-based service that includes a plurality of storage nodes that are distributed across a plurality of computer zones of a cloud computing platform and facilitate data storage for at least one other cloud-based service operating on the cloud computing platform, wherein the cloud-based service is associated with location information generated by ones of the plurality of storage nodes, wherein each computer zone of the plurality of computing zones provides a corresponding network of nodes isolated from networks of nodes corresponding to other computing zones, and wherein the location information identifies, for a given one of the plurality of storage nodes, which one of the plurality of computer zones in which that given storage node resides;
    accessing, by the client node from a metadata store that stores the location information, at least a portion of the location information that corresponds to storage nodes that store the particular data, wherein the storage nodes include a remote storage node that is remote to the computer zone of the client node;
    determining, by the client node based on the accessed portion of the location information, whether there is a local storage node that stores the particular data and is within a same computer zone as the client node; and
    based on the local storage node storing the particular data, sending, by the client node, a data request for the particular data to the local storage node that is local to the computer zone of the client node instead of the remote storage node that is remote to the computer zone of the client node.

2. The method of claim 1, wherein the location information is stored in a plurality of cookies at the metadata store, and wherein the portion of the location information corresponds to one or more of the plurality of cookies.

3. The method of claim 1, wherein the metadata store is distributed across the plurality of computer zones such that a given computer zone of the plurality of computer zones includes an instance of the metadata store, and wherein the accessing includes issuing, to an instance of the metadata store in the computer zone of the client node, a search request to identify ones of the plurality of storage nodes that store the particular data.

4. The method of claim 1, wherein ones of the plurality of computer zones reside in different geographical regions, and wherein the location information identifies, for the given storage node, a geographical region in which that given storage node resides.

5. The method of claim 1, wherein the cloud-based service is a storage service accessible to a database service implemented by the client node, and wherein the method further comprises the client node performing a database transaction that involves accessing the particular data.

6. The method of claim 1, wherein the given storage node is operable to:
    generate a subpart of the location information that identifies the computer zone having the given storage node; and
    store the subpart at the metadata store.

7. The method of claim 1, wherein the location information identifies, for a key range, ones of the plurality of storage nodes that store records for the key range.

8. The method of claim 1, wherein the plurality of storage nodes are distributed across the plurality of computer zones such that at least a threshold number of storage nodes are within a computer zone.

9. A non-transitory computer readable medium having program instructions stored thereon that are capable of causing a computer system to perform operations comprising:
    determining to access particular data that is stored by a cloud-based service that includes a plurality of storage nodes that are distributed across a plurality of computer zones of a cloud computing platform and facilitate data storage for at least one other cloud-based service operating on the cloud computing platform, wherein the cloud-based service is associated with location information generated by ones of the plurality of storage nodes, wherein each computer zone of the plurality of computing zones provides a corresponding network of nodes isolated from networks of nodes corresponding to other computing zones, and wherein the location information identifies, for a given one of the plurality of storage nodes, which one of the plurality of computer zones in which that given storage node resides;

accessing, from a metadata store that stores the location information, at least a portion of the location information that corresponds to storage nodes that store the particular data, wherein the storage nodes include a remote storage node that is remote to the computer zone of the computer system;

determining, based on the accessed portion of the location information, whether there is a local storage node that stores the particular data and is within a same computer zone as the computer system; and based on the local storage node storing the particular data, sending a data request for the particular data to the local storage node that is local to the computer zone of the computer system instead of the remote storage node that is remote to the computer zone of the computer system.

10. The non-transitory computer readable medium of claim 9, wherein the at least a portion of the location information corresponds to one or more of a plurality of cookies that collectively include the location information.

11. The non-transitory computer readable medium of claim 10, wherein the metadata store is a service distributed across the plurality of computer zones such that the plurality of cookies are locally accessible to the computer system in the computer zone of the computer system.

12. The non-transitory computer readable medium of claim 9, wherein the operations further comprise:
implementing a database server of a database service, including receiving a request from an application server to perform a database transaction and performing the database transaction that involves accessing the particular data.

13. The non-transitory computer readable medium of claim 9, wherein the location information identifies, for the given storage node, which one of a plurality of geographical regions in which the given storage node resides.

14. The non-transitory computer readable medium of claim 9, wherein the location information identifies, for a key range, ones of the plurality of storage nodes that store records for the key range.

15. A system, comprising:
at least one processor; and
a memory having program instructions stored thereon that are executable by the at least one processor to cause the system to perform operations comprising:

determining to access particular data that is stored by a cloud-based service that includes a plurality of storage nodes that are distributed across a plurality of computer zones of a cloud computing platform and facilitate data storage for at least one other cloud-based service operating on the cloud computing platform, wherein the cloud-based service is associated with location information generated by ones of the plurality of storage nodes, wherein each computer zone of the plurality of computing zones provides a corresponding network of nodes isolated from networks of nodes corresponding to other computing zones, and wherein the location information identifies, for a given one of the plurality of storage nodes, which one of the plurality of computer zones in which that given storage node resides;

accessing, from a metadata store that stores the location information, at least a portion of the location information that corresponds to storage nodes that store the particular data, wherein the storage nodes include a remote storage node that is remote to the computer zone of the system;

determining, based on the accessed portion of the location information, whether there is a local storage node that stores the particular data and is within a same computer zone as the system; and based on the local storage node storing the particular data, sending a data request for the particular data to the local storage node that is local to the computer zone of the system instead of the remote storage node that is remote to the computer zone of the system.

16. The system of claim 15, wherein the operations further comprise:
implementing a database server of a database service, including receiving a request from an application server to perform a database transaction and performing the database transaction that involves accessing the particular data.

17. The system of claim 15, wherein the metadata store is distributed across the plurality of computer zones, and wherein the accessing includes issuing, to an instance of the metadata store in the computer zone of the system, a search request to identify ones of the plurality of storage nodes that store the particular data.

18. The system of claim 15, wherein the at least a portion corresponds to one or more of a plurality of cookies that collectively include the location information.

19. The system of claim 15, wherein ones of the plurality of computer zones reside in different geographical regions, and wherein the location information identifies, for the given storage node, a geographical region in which that given storage node resides.

20. The system of claim 15, wherein the location information identifies, for a key range, ones of the plurality of storage nodes that store records for the key range.

* * * * *